US 6,539,142 B2

(12) United States Patent
Lemoff et al.

(10) Patent No.: US 6,539,142 B2
(45) Date of Patent: Mar. 25, 2003

(54) SYSTEM AND METHOD FOR ACTIVELY ALIGNING MIRRORS IN AN OPTICAL SWITCH

(75) Inventors: Brian E. Lemoff, Union City, CA (US); Charles D. Hoke, Palo Alto, CA (US); Dale W. Schroeder, Scotts Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/872,440

(22) Filed: Jun. 1, 2001

(65) Prior Publication Data
US 2002/0181848 A1 Dec. 5, 2002

(51) Int. Cl.$^7$ ................................................ G02B 6/26
(52) U.S. Cl. ................................ 385/18; 385/17; 385/18; 385/52
(58) Field of Search .......................... 385/17, 18, 52; 359/237–239, 245–247, 265; 365/115, 116, 119

(56) References Cited

U.S. PATENT DOCUMENTS 4,696,062 A * 9/1987 LaBudde .................... 356/138
6,253,001 B1 * 6/2001 Hoen ........................... 385/16
6,301,402 B1 * 10/2001 Bhalla et al. ................ 359/128
6,320,993 B1 * 11/2001 Laor ........................... 361/737
6,330,102 B1 * 12/2001 Daneman et al. ........... 359/290
6,411,751 B1 * 6/2002 Giles et al. ................... 385/16

* cited by examiner

Primary Examiner—Robert H. Kim
Assistant Examiner—Richard Kim

(57) ABSTRACT

In a 3D MEMS optical switch titling mirrors are actively aligned to minimize losses in optical power. In one embodiment the optical signals in the output fibers are tapped and detected and the sensed outputs are used by a control circuit with a feedback loop that adjusts the alignment signals sent to the MEMS actuators. In a second embodiment, an emitter which is either a single LED or laser diode is optically coupled to the output fibers for injecting alignment beams back into the fibers. The alignment beams have a frequency bandwidth outside that of the information beams. The alignment beams are detected at the input fibers via directional optical couplers and the sensed outputs are used by a control circuit with a feedback loop to adjust the alignment signals. The alignment signals are dithered and their phase and amplitude shifts are used to generate the appropriate feedback signals.

16 Claims, 2 Drawing Sheets

SYSTEM AND METHOD FOR ACTIVELY ALIGNING MIRRORS IN AN OPTICAL SWITCH

FIELD OF THE INVENTION

The present invention relates to telecommunications networks, and more particularly, to pure optical switches which direct light pulses from one optical fiber to another without electrical conversion.

BACKGROUND OF THE INVENTION

Telecommunications service providers continue to seek ever greater bandwidth at ever lower prices. Their data networks must be flexible to allow for continual upgrades, also referred to as "provisioning". They must also designed for rapid fault recovery to avoid service degradation and even outages. High speed optical data networks now carry most of the long haul, and much of the metropolitan area data traffic in developed countries. Along such networks microprocessor controlled routers perform so-called "OEO" transcriptions, converting optically encoded data received from input optical fibers to electrical signals, reading destination code, and then reconverting the electrical signals back to optically encoded data and sending it along output optical fibers. As transmission speeds pass 2.488 Gbits/sec (OC-48 level), this conversion step becomes more difficult to perform and the cost of conventional high throughput electrical switches becomes unacceptable.

Pure optical switches direct light pulses directly from one optical fiber to another without electrical conversion and therefore offer the promise of eliminating much of the OEO transcriptions in high bandwidth fiber optic data transmission networks. Electrical routing intelligence would still be needed to direct traffic. However, currently about eighty percent of the traffic handled by a conventional router passes straight through and reading the destination header in most cases is a waste of time and system resources. By separating the control information from the transmitted data, pure optical switching would bring substantial increases in the throughput rate of optical data networks.

A variety of miniature electromechanical devices have been developed for changing the path of light in free space to direct light pulses from one optical fiber to another optical fiber. One promising approach utilizes three dimensional (3D) microelectromechanical systems (MEMS). Generally speaking, MEMS fabrication technology involves shaping a multi-layer monolithic structure by sequentially depositing and configuring layers of a multi-layer wafer. The wafer typically includes a plurality of polysilicon layers that are separated by layers of silicon dioxide and silicon nitride. The shaping of individual layers is done by etching that is controlled by masks patterned by photolithographic techniques. MEMS fabrication technology also entails etching intermediate sacrificial layers of the wafer to release overlying layers for use as thin elements that can be easily deformed and moved. Further details of MEMS fabrication technology may be found in a paper entitled "MEMS The Word for Optical Beam Manipulation" published in *Circuits and Devices,* July 1997, pp. 11–18. See also "Multiuser MEMS Processes (MUMPS) Introduction and Design Rules" Rev. 4, Jul. 15, 1996 MCNC Mems Technology Applications Center, Research Triangle Park, North Carolina 27709 by D. Keoster, R. Majedevan, A. Shishkoff and K. Marcus.

FIG. 1 is a diagrammatic illustration of a conventional 3D MEMS optical switch 10. A first array 12 of micro-machined mirrors is aligned with an input optical fiber bundle 14, and juxtaposed opposite a second array 16 of micro-machined mirrors. Electrical command signals from a switch controller (not illustrated) cause individual mirrors in the arrays 12 and 16 to tilt. Input light pulses transmitted through a selected fiber in the input bundle 14 that strike an individual mirror in the first array 12 can be directed to another specific mirror in the second array 16 and from that mirror to a selected fiber in an output optical fiber bundle 18 aligned with the second array 16. The individual light beams travel along Z-shaped paths 19 in free space. There is usually a lens (not illustrated) between the first and second mirror arrays 12 and 14. The purpose of this lens is to image the facets of the fibers in the input bundle 14 onto the facets of the fibers in the output bundle 18. Because the light beams coming out of the fibers in the input bundle 14 diverge, the lens is necessary to focus the light onto the fibers in the output bundle 18. In some cases, there are two lenses between the two arrays 12 and 14 to form a sort of telescope in order to accomplish this imaging. The optical switch 10 has distinct advantages over electrical switches in that the former operates completely independent of changes in the bit rate, wavelength and polarization.

3D MEMS optical switches are targeted for use in network cores and nodes in both long haul and metropolitan area data networks. 2D MEMS optical switches simply raise or lower pop-up mirrors at fixed angles to switch to a given data port. See for example U.S. Pat. No. 5,994,159 of Aksyuk et al. assigned to Lucent Technologies, Inc. and U.S. Pat. No. 6,097,859 of Sogarard et al. assigned to the Regents of the University of California. In the 3D MEMS optical switch of FIG. 1, optical signals are reflected by the first and second arrays 12 and 16 each made of micro-machined mirrors that can each be tilted variable amounts in two axes, bouncing an incoming optical signal from a selected optical fiber in the input bundle 14 to a selected optical fiber in the output bundle 18 in a manner that results in less signal loss than in 2D MEMS optical switches.

The 3D MEMS optical switch of FIG. 1 accommodates any data rate or transmission protocol and its architecture is more readily scalable than 2D MEMS optical switch designs. Larger switching capacities are achieved simply by doubling, rather than squaring, the number of mirrors needed for the desired channel count. 2D MEMS optical switches are really not practical beyond a 32×32 matrix. 3D MEMS optical switches have been commercially announced that offer a 64×64 input/output capacity in a relatively small form factor. They have high cross-talk rejection and flat passband response and are well suited for use in wavelength-division multiplexed (WDM) optical data networks.

While 3D MEMS optical switches show great promise, precise angular alignment of the miniature mirrors can be difficult to achieve. Precise alignment is needed in order to minimize optical losses.

SUMMARY OF THE INVENTION

It is therefore the primary object of the present invention to provide a system and method for actively aligning titling mirrors in a pure optical switch.

In accordance with a first embodiment of our invention a system for actively aligning mirrors in an optical switch includes a plurality of input optical fibers, a plurality of output optical fibers and at least one array of tilting mirrors. Each tilting mirror receives a beam of light from a corresponding one of the input optical fibers and directs the beam of light for receipt by a predetermined one of the output optical fibers. A plurality of actuators each progressively tilt a corresponding one of the mirrors. A plurality of fractional taps such as directional optical couplers, dichroic mirrors, optical wavelength multiplexer/de-multiplexer devices or other devices each redirect a portion of the beam of light received by a corresponding one of the output optical fibers. A plurality of detectors are each optically coupled to a corresponding one of the optical taps. A control circuit is connected to the detectors and to the actuators and precisely tilts each mirror to minimize losses in optical signal power resulting from the routing of each light beam as it is switched from a predetermined one of the input optical fibers to a predetermined one of the output optical fibers.

In accordance with a second embodiment of our invention a system for actively aligning mirrors in an optical switch includes a plurality of input optical fibers, a plurality of output optical fibers, a first array of tilting mirrors and a second array of titling mirrors. Each mirror in the first array receives an information beam of light from a corresponding one of the input optical fibers and each mirror in the second array receives the information beam from a corresponding mirror in the first array and directs the information beam for receipt by a predetermined one of the output optical fibers. A first plurality of actuators each progressively tilt a corresponding one of the mirrors of the first array. A second plurality of actuators each progressively tilt a corresponding one of the mirrors of the second array. A first plurality of mechanisms such as directional optical couplers each connect an emitter to a corresponding one of the output optical fibers for injecting an alignment beam of light. A second plurality of mechanisms such as directional optical couplers each connect a corresponding one of the input optical fibers for receiving the alignment beam transmitted therethrough. A plurality of detectors are each connected to a corresponding one of the second plurality of directional optical couplers and each generate an electrical signal representative of the alignment beam. A control circuit is connected to the detectors and to the actuators. The control circuit precisely tilts each mirror to minimize losses in optical signal power resulting from the routing of each light beam switched from a predetermined one of the input optical fibers to a predetermined one of the output optical fibers.

In accordance with a first embodiment of our method for actively aligning mirrors in an optical switch, a plurality of information light beams are transmitted through free space between corresponding optical fibers in an input bundle and an output bundle utilizing a plurality of arrays of tilting mirrors to direct the information light beams. Each corresponding optical input fiber and optical output fiber define a channel. A loss in optical power in each of the channels is detected by tapping into each optical output fiber. An alignment signal is generated for each channel based on the loss detected for that channel. The alignment signal is utilized to control an actuator associated with each tilting mirror to direct the information light beam for each channel so as to minimize the optical loss in that channel.

In accordance with a second embodiment of our method for actively aligning mirrors in an optical switch, a plurality of information light beams are transmitted through free space between corresponding optical fibers in an input bundle and an output bundle utilizing a plurality of arrays of tilting mirrors to direct the information light beams. Each corresponding optical input fiber and optical output fiber define a channel. A plurality of alignment light beams are transmitted through free space between corresponding optical fibers in the output bundle and the input bundle utilizing the plurality of arrays of tilting mirrors to direct the alignment light beams. A loss in optical power of the alignment light beam in each of the channels is detected. An alignment signal is generated for each channel based on the loss in optical power of the light beam detected for that channel. The alignment signal is utilized to control an actuator associated with each tilting mirror directing the information light beam for each channel so as to minimize the optical loss in that channel.

The first and second embodiments may also be simplified to provide 1×N optical switches.

DESCRIPTION OF THE PREFERRED EMBODIMENTS

Figure 1:
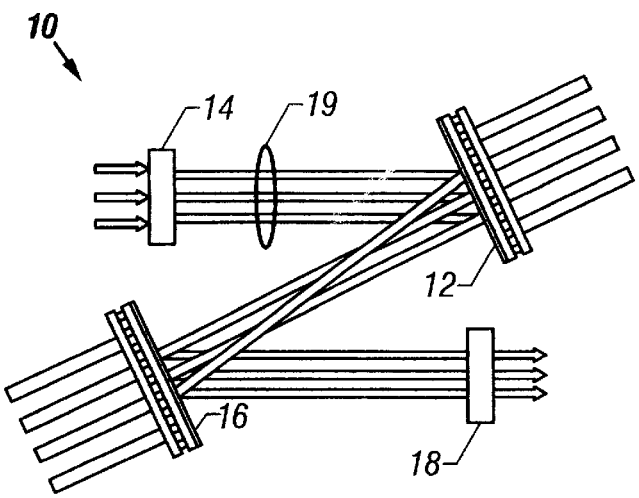
FIG. 1 is a diagrammatic side elevation view illustrating a conventional 3D MEMS optical switch.
Figure 2:
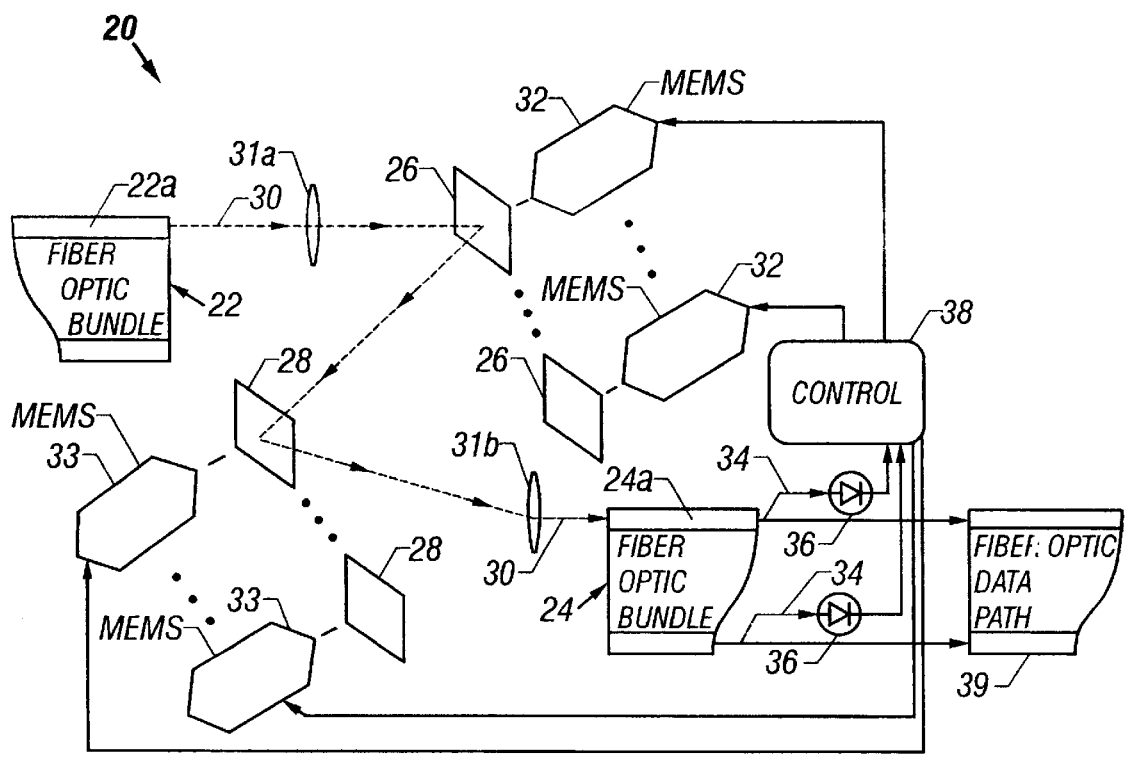
FIG. 2 is a schematic diagram of a first embodiment of a system for actively aligning mirrors in a 3D MEMS optical switch.

Referring to FIG. 2, a system 20 for actively aligning mirrors in an optical switch includes a first bundle 22 containing a first plurality of input optical fibers, a second bundle 24 containing a second plurality of output optical fibers, and first and second opposing arrays of micromachined tilting mirrors 26 and 28. The polished end faces or facets of the first bundle 22 are all co-planar. The polished end faces or facets of the second bundle 24 are also all co-planar. The input optical fibers and the output optical fibers of the bundles 22 and 24 are preferably held in a conventional alignment device or coupling mechanism (not illustrated) typically including an alignment sleeve along with male and female parts. Each tilting mirror 26 of the first array receives a beam of light 30 from a corresponding one of the input optical fibers such as 22a and directs the beam of light 30 for receipt by a predetermined one of the mirrors 28 of the second array which directs the beam 30 to a predetermined one of the output optical fibers such as 24a. The beam of light 30 is illustrated as a dashed line in FIG. 2 and passes between the bundles 22 and 24 and the mirrors 26 and 28 in so-called free space, i.e. without passing through any physical medium other than gas except for two lenses 31a and 31b.

The lenses 31a and 31b (FIG. 2) are positioned between the bundles 22 and 24. The lenses 31a and 31b image the light beam 30 from the input optical fiber 22a to the output optical fiber 24a. The lenses 31a and 31b accommodate divergence of the light beams as they exit the input bundle 22. The lenses 31a and 31b thus image the light from the plurality of facets of the input bundle 22 to the facets of the output bundle 24.

A first plurality of MEMS actuators 32 (FIG. 2) each progressively tilt a corresponding one of the mirrors 26. A second plurality of MEMS actuators 33 each progressively tilt a corresponding one of the mirrors 28. A plurality of fractional taps 34 each redirect a portion of the beam of light 30 received by a corresponding one of the output optical fibers such as 24a. A plurality of optical detectors 36 are each optically coupled to a corresponding one of the fractional taps 34. A control circuit 38 is connected to the detectors 36 and to the MEMS actuators 32 and 33 and precisely tilts each of the mirrors 26 and 28 to minimize losses in optical signal power resulting from the routing of each information carrying light beam 30, as it is switched from a predetermined one of the input optical fibers in the bundle 22 to a predetermined one of the output optical fibers in the bundle 24.

The beneficial results of the system 20 depend on prior proper alignment of the optical fibers in the bundles 22 and 24. The control circuit 38 may have a feedback loop or other suitable architecture. Directional optical couplers are one form of the fractional taps 34. Sometimes directional couplers that have a weak wavelength dependence are used as a fractional tap, while other directional couplers with a strong wavelength dependence can be used to separate different wavelengths. The embodiment of FIG. 2 is not wavelength dependent so can utilize fractional taps 34 as a means for each redirecting a portion of the beam of light 30 received by each one of the output optical fibers. Most of the light in each beam 30 leaves the fractional taps 34 and is conveyed along the fiber optic data path 39. A fraction of the light in each beam is tapped off by the fractional taps 34 and received by the detectors 36.

Figure 3:
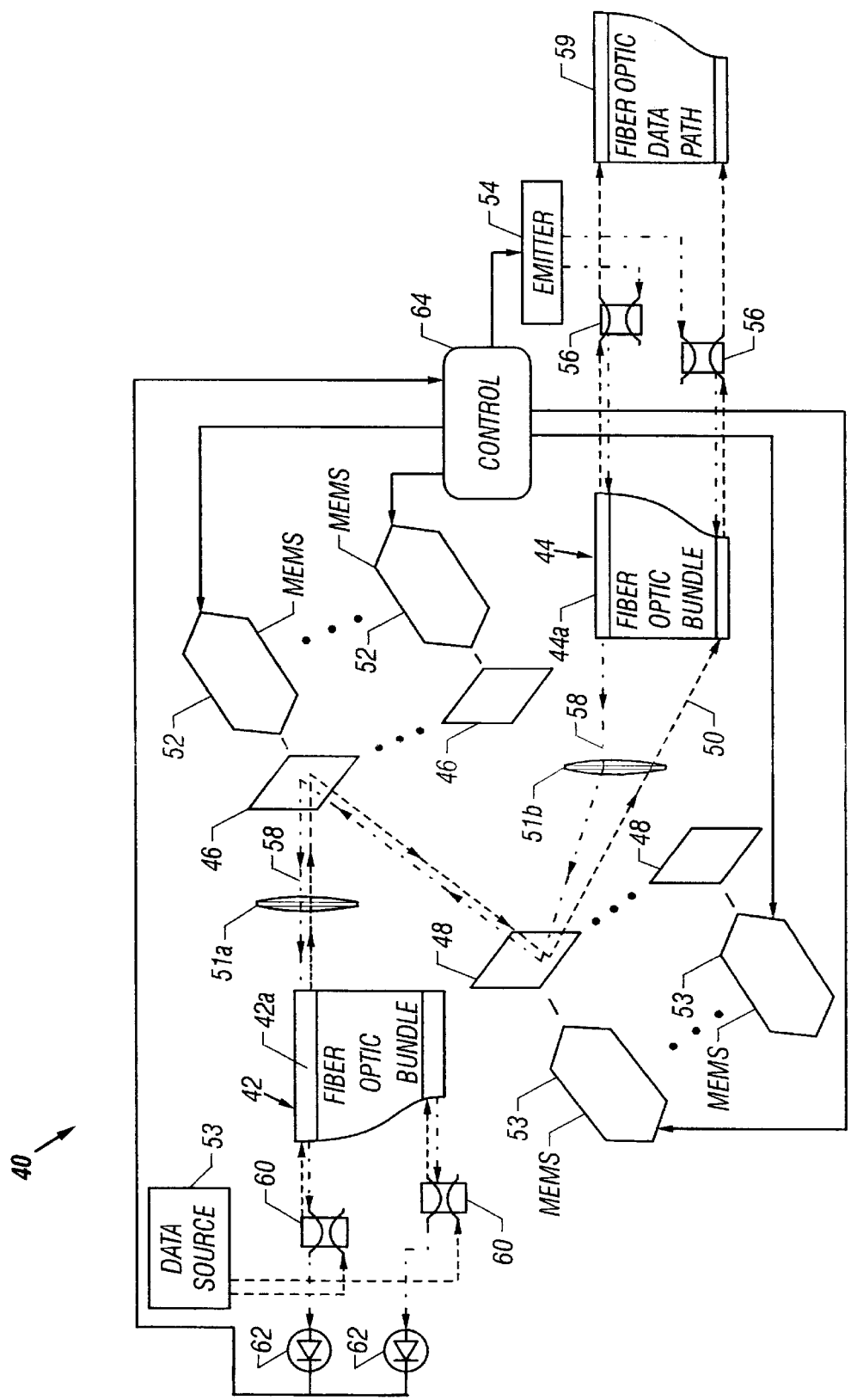
FIG. 3 is a schematic diagram of a second embodiment of a system for actively aligning mirrors in a 3D MEMS optical switch.

The system 20 of FIG. 2 has the disadvantage that by tapping the optical signal being switched, loss is introduced into that channel. Also, if no light is currently being transmitted in a particular channel, active alignment cannot be achieved. FIG. 3 is a schematic diagram of an alternate system 40 for actively aligning mirrors in a 3D MEMS optical switch which overcomes the foregoing drawbacks. The system 40 includes a first bundle 42 containing a first plurality of input optical fibers, a second bundle 44 containing a second plurality of output optical fibers, and first and second opposing arrays of micro-machined tilting mirrors 46 and 48. The polished end faces or facets of the first bundle 42 are all co-planar. The polished end faces or facets of the second bundle 44 are also all co-planar. The input optical fibers and the output optical fibers of the bundles 42 and 44 are preferably held in a conventional alignment device or coupling mechanism (not illustrated) typically including an alignment sleeve along with male and female parts.

Each tilting mirror 46 (FIG. 3) of the first array receives an information beam of light 50 from a corresponding one of the input optical fibers such as 42a and directs the beam of light 50 for receipt by a predetermined one of the output optical fibers such as 44a. There are actually a plurality of beams of light 50 propagating through the system 40 from left to right in FIG. 2 from the various fibers in the input bundle 42 to the various fibers in the output bundle 44. Only one beam of light 50 is illustrated in FIG. 3 as a series of dashes. Each information beam of light 50 is generated by a data source 53 and carries information typically encoded via some form of modulation. Each beam 50 is imaged onto a facet of a corresponding output optical fiber, such as 44a, by a pair of lenses 51a and 51b that are positioned between the two arrays of mirrors 46 and 48.

Referring still to FIG. 3, a first plurality of MEMS actuators 52 each progressively tilt a corresponding one of the mirrors 46. A second plurality of MEMS actuators 53 each progressively tilt a corresponding one of the mirrors 48. An emitter 54 such as a single LED or a single laser diode simultaneously illuminates the facets of all the optical fibers of the second bundle 44. This is accomplished using a first plurality of directional optical couplers 56. The emitter 54 generates, via the directional optical couplers 56, a plurality of alignment beams of light 58 having a wavelength band different from that of the information beams 50 carrying the data being transmitted by the system 40. The emitter 54 is coupled to the facets of the output optical fibers 44 via the directional optical couplers 56 to inject the light beams 58 that are illustrated in FIG. 3 as a series of dots and dashes. The alignment light beams 58 propagate through the system 40 (from right to left in FIG. 3) in a direction opposite to that of the information light beams 50. Inside the system 40, each alignment beam 58 for each channel will propagate along the same exact path, only in the opposite direction, as the information light beam 50 for the same channel. The information light beams 50 continue along the fiber optic data path 59.

A second plurality of directional optical couplers 60 (FIG. 3) is used to extract the alignment beams 58 from the optical fibers of the input bundle 42. Each of the directional optical couplers 60 is coupled to a corresponding detector 62. The information light beams 50 are transmitted from the data source 53 through the same directional optical couplers 60 to the optical fibers of the input bundle 42. The output signals from the plurality of detectors 62 are fed to a control circuit 64. The control circuit 64 is connected to the MEMS actuators 52 and 53 and precisely tilts each of the mirrors 46 and 48 to minimize losses in optical signal power resulting from the routing of each information light beam 50, as it is switched from a predetermined one of the input optical fibers in the bundle 42 to a predetermined one of the output optical fibers in the bundle 44. The control circuit 64 may have a feedback loop or other suitable architecture.

The directional optical couplers 56 and 60 of the system 40 of FIG. 3 have a wavelength dependence that is selected so that the information light beams 50 and the alignment beams 58 are correctly routed. Of course the correct ports of each directional optical coupler must be connected to the correct facets, emitter and detector.

The control circuits 38 and 64, must derive a correction signal in order to actively align the micro-machined mirrors in a manner that minimizes loss of optical power in the switching process. This is preferably accomplished by dithering each mirror, via its associated MEMS actuator, with an electrical alignment signal having a very small amplitude at a frequency outside the frequency band of the data being transmitted. By measuring the shift in the phase and amplitude of the alignment signal, an appropriate feedback signal can be derived to adjust the mirror angle. Since each switch connection for each optical channel involves two mirrors, each having two dimensions or freedoms of movement, four distinct dither frequencies must be utilized in the case of a 3D MEMS optical switch.

Thus, in accordance with a first embodiment of our method, the plurality of information light beams 30 (FIG. 2) are transmitted through free space between corresponding optical fibers in the input bundle 22 and the output bundle 24 utilizing the two generally planar arrays of tilting mirrors 26 and 28 to direct the information light beams 30. Each corresponding optical input fiber, such as 22a, and optical output fiber, such as 24a, define a channel. A loss in optical power in each of the channels is detected by tapping into each optical output fiber utilizing fractional taps 34 and optical detectors 36. An alignment signal is generated for each channel based on the loss detected for that channel. The alignment signal is utilized by the control circuit 38 to control MEMS actuators 32 and 33 associated the tilting mirrors 26 and 28 to direct the information light beam 30 for each channel so as to minimize the optical loss in that channel.

In accordance with a second embodiment of our method, a plurality of information light beams 50 are transmitted through free space between corresponding optical fibers in the input bundle 42 and the output bundle 44 utilizing the two generally planar arrays of tilting mirrors 56 and 58 to direct the information light beams 50. Each corresponding optical input fiber and optical output fiber define a channel. The plurality of alignment light beams 58 are transmitted into the output fibers in the bundle 44 via emitter 54 and directional optical couplers 56 and then through free space to corresponding optical fibers in the input bundle 42 utilizing the plurality of arrays of tilting mirrors 46 and 48 to direct the alignment light beams 58. A loss in optical power of the alignment light beam 58 in each of the channels is detected via directional optical couplers 60 and detectors 62. An alignment signal is generated for each channel based on the loss in optical power of the alignment light beam 58 detected for that channel. The alignment signal is utilized to control, via control circuit 64, the MEMS actuators 52 and 53 associated with each tilting mirror directing the information light beam 50 for each channel so as to minimize the optical loss in that channel.

Both the first and second embodiments of our method are preferably practiced by dithering the alignment signal to each of the MEMS actuators and by adjusting the alignment signal based on a feedback signal that reflects shifts in the gain and phase of the alignment signal. Also, both methods are preferably practiced by using a frequency for the alignment signal that is outside a frequency bandwidth of the information light beam. In addition, both embodiments are preferably performed in the context of a 3D MEMS optical switch which requires that four electrical alignment signals be generated and applied for each channel.

While we have described two preferred embodiments of our system and method for actively aligning mirrors in a pure optical switch, adaptations and modifications thereof will occur to those skilled in the art. For example, the concept is applicable to any optical switch wherein beams of light are redirected, by mirrors, lenses or other movable devices. Both the FIG. 2 and FIG. 3 embodiments could be simplified to provide a 1×N optical switch in which case only a single input fiber would be necessary along with a single mirror tiltable in two axes in place of the first array of mirrors. In addition, in the case of the 1×N version of the FIG. 3 embodiment, only a single directional optical coupler and detector would be needed at the input end of the system. The system 20 of FIG. 2 could be simplified to use only the single array of mirrors 26 and associated MEMS actuators 32 so that the beam of light 30 would be reflected back into a different optical fiber in the bundle 22 from which it came. The actuators that tilt the mirrors could be MEMS actuators, piezo-electric devices, electrostatic devices and hybrids of the same. A directional coupler is not the most general type of device used to couple and extract the alignment wavelength. Any optical wavelength multiplexer/de-multiplexer could be utilized in the FIG. 3 embodiment. For example, a thin film filter (dichroic mirror) could be used to combine or separate wavelengths. The use of directional couplers is only representative of our illustrated embodiments. The use of a thin-film filter would probably be preferable because most commercially available "band splitter" devices use thin film technology, rather than directional coupler technology. Therefore, the protection afforded our invention should only be limited in accordance with the scope of the following claims.

We claim:

1. A system for actively aligning mirrors in an optical switch, comprising:
   a plurality of input optical fibers;
   a plurality of output optical fibers;
   a first array of tilting mirrors;
   a second array of titling mirrors;
   each mirror in the first array positioned for receiving an information beam of light from a corresponding one of the input optical fibers and each mirror in the second array positioned for receiving the information beam from a corresponding mirror in the first array and for directing the information beam for receipt by a predetermined one of the output optical fibers;
   a first plurality of actuators each for tilting a corresponding one of the mirrors of the first array;
   a second plurality of actuators each for tilting a corresponding one of the mirrors of the second array;
   an emitter;
   a first plurality of means for each connecting the emitter to a corresponding one of the output optical fibers for injecting an alignment beam of light;
   a second plurality of means for each connecting a corresponding one of the input optical fibers for receiving the alignment beam transmitted therethrough;
   a plurality of detectors each connected to a corresponding one of the second plurality of connecting means for generating an electrical signal representative of the alignment beam; and
   a control circuit connected to the detectors and to the actuators that precisely tilts each mirror to minimize losses in optical signal power resulting from the routing of each light beam switched from a predetermined one of the input optical fibers to a predetermined one of the output optical fibers.

2. The system of claim 1 wherein a frequency of the alignment beams is in a first wavelength band that is different from a second wavelength band of the information beams.

3. The system of claim 1 wherein the first and second arrays of mirrors are juxtaposed opposite each other and there is at least one lens for imaging the beam of light from a facet of the corresponding input optical fiber onto a facet of the predetermined output optical fiber.

4. The system of claim 1 wherein the actuators are selected from the group consisting of piezo-electric transducers, electrostatic comb devices and MEMS actuators.

5. The system of claim 1 wherein the first and second connecting means are directional optical couplers.

6. The system of claim 1 wherein the input optical fibers and the output optical fibers are held in an alignment device.

7. The system of claim 1 wherein the control circuit includes a feed-back loop that generates an alignment signal to be applied to each of the actuators for dithering the corresponding mirror.

8. The system of claim 7 wherein a frequency of the alignment signal is outside a frequency band of the information beam.

9. The system of claim 8 wherein the control circuit generates a plurality of alignment signals corresponding to each channel of the system, a channel being defined by a path of an information beam from an input optical fiber to an output optical fiber.

10. The system of claim 7 wherein the alignment signal is generated based on a feedback signal reflecting shifts in an amplitude and in a phase of the alignment signal.

11. A method for actively aligning mirrors in an optical switch, comprising the steps of:
   transmitting a plurality of information light beams through free space between corresponding optical fibers in an input bundle and an output bundle utilizing a plurality of arrays of tilting mirrors to direct the information light beams, each corresponding optical input fiber and optical output fiber defining a channel;

transmitting a plurality of alignment light beams through free space between corresponding optical fibers in the output bundle and the input bundle in a direction opposite to that of the propagation of the information light beams utilizing the plurality of arrays of tilting mirrors to direct the alignment light beams;

detecting a loss in optical power of the alignment light beam in each of the channels;

generating an alignment signal for each channel based on the loss in optical power of the light beam detected for that channel; and using the alignment signal to control an actuator associated with each tilting mirror directing the information light beam for each channel so as to minimize the optical loss in that channel.

12. The method of claim 11 and further comprising the step of dithering each of the tilting mirrors with the alignment signal.

13. The method of claim 12 wherein a frequency of the alignment signal is outside a frequency band of the information beam.

14. The method of claim 11 wherein the alignment signal is generated based on a feedback signal reflecting shifts in an amplitude and in a phase of the alignment signal.

15. The method of claim 14 wherein two mirrors are each tilted in two different directions in switching each channel and four alignment signals are generated for each channel.

16. A system for actively aligning mirrors in an optical switch, comprising:

an input optical fiber;

a plurality of output optical fibers;

a single tilting mirror positioned for receiving an information beam of light from the input fiber and redirecting the beam of light;

an array of titling mirrors;

each mirror in the array being positioned for receiving the information beam of light from the input optical fiber and for directing the information beam for receipt by a predetermined one of the output optical fibers;

a plurality of actuators each for tilting a corresponding one of the mirrors;

an emitter;

a plurality of first means for each connecting the emitter to a corresponding one of the output optical fibers for injecting an alignment beam of light;

second means for connecting the input optical fiber for receiving the alignment beam transmitted therethrough;

a detector connected to the second connecting means for generating an electrical signal representative of the alignment beam; and a control circuit connected to the detectors and to the actuators that precisely tilts each mirror to minimize losses in optical signal power resulting from the routing of each light beam switched from the input optical fiber to a predetermined one of the output optical fibers.

* * * * *